May 19, 1936.  J. C. ZEDER  2,041,507
COMBINATION FAN AND VIBRATION DAMPER
Filed Jan. 19, 1934
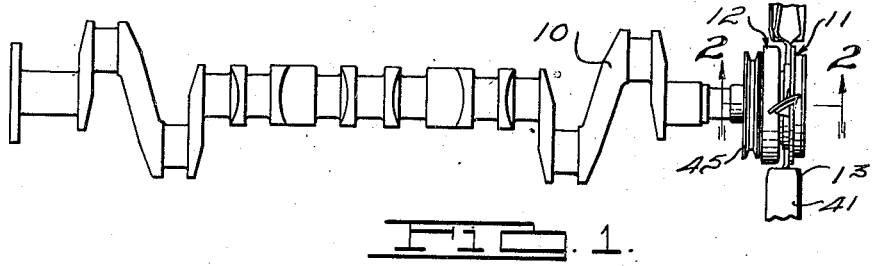
FIG. 1.
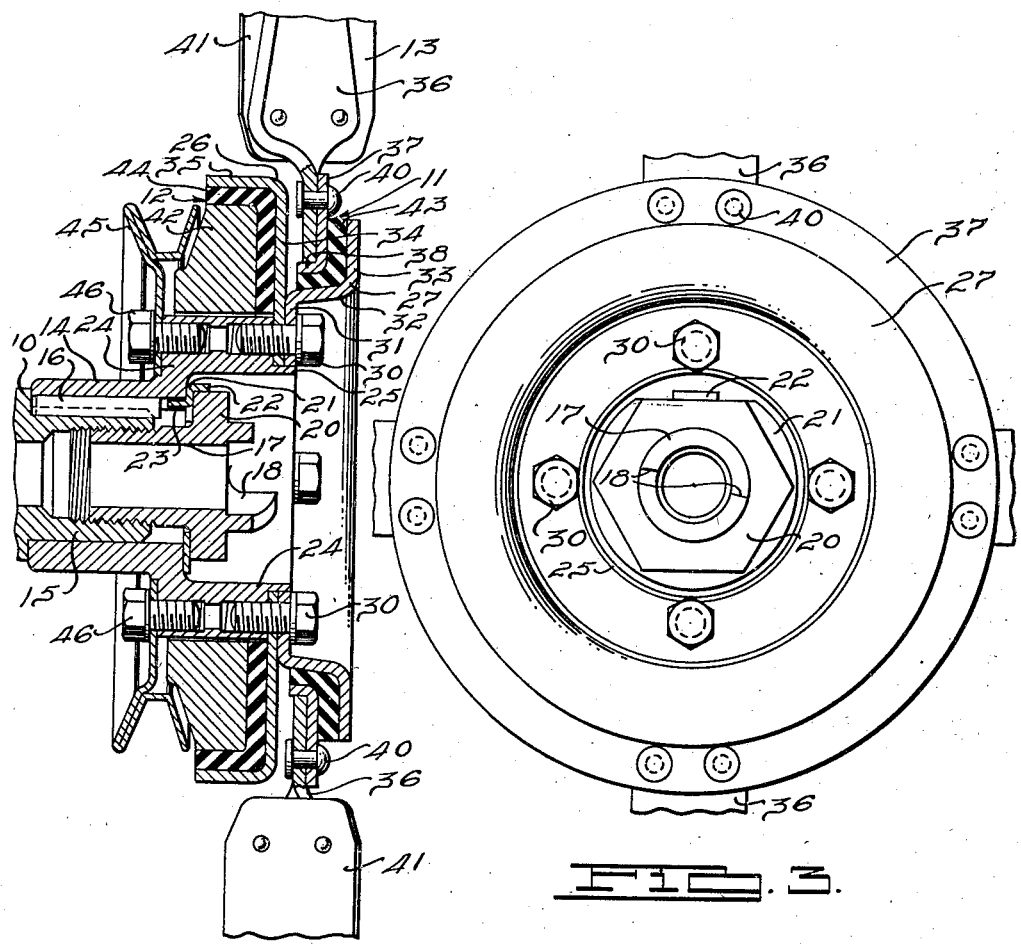
FIG. 2.
FIG. 3.
INVENTOR.
JAMES C. ZEDER.
BY Harness, Lind, Pater & Harris
ATTORNEYS.

Patented May 19, 1936

2,041,507

UNITED STATES PATENT OFFICE 2,041,507

COMBINATION FAN AND VIBRATION DAMPER

James C. Zeder, Detroit, Mich., assignor to Chrysler Corporation, Detroit, Mich., a corporation of Delaware Application January 19, 1934, Serial No. 707,314

9 Claims. (Cl. 230—272)

This invention relates to vibration dampers for the crank shaft of an internal combustion engine.

The main objects of the invention are to provide an improved vibration dampening mechanism including a plurality of inertia members yieldably connected to the crank shaft and adapted for relative movement thereon; to utilize the fan for the cooling system of the internal combustion engine and one of said inertia members, to quiet the operation of such fan; and to provide a yieldable drive connection for the fan having the proper degree of flexibility so as to prevent breakage thereof.

Other objects and advantages will become apparent from the following description and appended claims.

For the purpose of illustrating the genus of the invention, a typical concrete embodiment thereof is shown in the accompanying drawing, in which:

Figure 1 is a side elevation of a crank shaft having vibration dampening mechanism constructed in accordance with the principles of this invention embodied thereon;

Fig. 2 is a vertical section taken on the line 2—2 of Fig. 1; and

Fig. 3 is an end elevation of the outer damper unit shown in Figs. 1 and 2.

In the form shown, a plurality of vibration damper units 11 and 12 are mounted on the front end of a crank shaft 10. Each of these damper units includes a member fixed for rotation on the crank shaft, an inertia member mounted for movement relative to said fixed member and crank shaft, and a yieldable or resilient member connecting said fixed and movable element so as to provide a flexible driving connection therebetween. In the illustrated embodiment the inertia member of the vibration damper unit 11 is the fan 13 for the cooling system of an internal combustion engine, not shown, of which the crank shaft 10 forms a part.

The vibration damper units 11 and 12 are both connected to the crank shaft 10 by means of a sleeve 14 which is adapted to fit on a reduced section 15 of the front end of the crank shaft 10. The sleeve 14 is provided with a key 16 by which it is secured against movement relative to the crank shaft 10. The extension 15 of the crank shaft 10 is also made hollow and internally threaded to receive a threaded crank socket 17 having a crank jaw 18 on its outer end. A nut portion 20 is provided on the outer periphery of the socket 17 for securing the sleeve member 14 against axial movement relative to the crank shaft 10. The nut portion 20 is preferably locked in a tightened position by a lock washer 21 which has laterally turned lugs 22 and 23, one of which is adapted to bear against a flat of the nut portion 20, and the other is adapted to be arranged within the key slot of the sleeve member 14 to prevent rotation of the crank socket 17 relative to the crank shaft 10 and to prevent axial movement of the key 16.

The forward end of the sleeve 14 is enlarged and the forward end of the enlarged portion 24 is annularly recessed to provide a shoulder 25 upon which a pair of holder or supporting discs 26 and 27 may be mounted in concentric relation with respect to the crank shaft 10. The supporting or holder discs 26 and 27 may be fastened to the enlarged portion 24 of sleeve 14 by means of bolts 30. The supporting or holder disc 27 comprises a radially extending web portion 31, a slightly outwardly flaring connecting portion 32 and a radially directed flange 33. The disc 26 includes a radially directed web portion 34 and an axially directed flange portion 35 at the outer periphery thereof. The blade supports 36 are secured by rivets 40 to an annulus 37 having an axially directed flange 38. The annulus 37, blade supports 36 and blades 41 of the fan 13 are utilized as the inertia member of the vibration dampening unit 11. The blades 41 and their support 36 are preferably so constructed and arranged as to distribute the mass of the inertia providing element of the damping unit 11 substantially symmetrically with respect to the central axis thereof which normally substantially coincides with the crank shaft axis. The vibration dampening unit 12 is provided with an inertia member 42 which may be of metal or of a non-metallic composition such as rubber in which a weighty material such as lead peroxide is incorporated.

A yieldable connecting element 43 comprising a flexible material, such as rubber, is interposed between the supporting annulus 37 of fan 13 and the holder or supporting disc 27. The annulus 37 and disc 27 are preferably made of steel and brass plated upon those surfaces which contact the yieldable element 43 so that the latter will readily vulcanize to these elements. A resilient connecting element 44 is likewise interposed between the holder or supporting disc 26 and the inertia member 42 with the contacting surfaces of the holder disc 26 brass plated and the contacting surfaces of the inertia member 42, if composed of metal, likewise treated to more readily vulcanize the resilient element to the inertia member and holder disc. In the event that the inertia member 42 is made of a non-metallic material, such as a rubber composition containing a weighty ingredient such as lead peroxide, the flexible rubber connecting element 44 and inertia member 42 may be molded at the same time within the holder disc 26 so that the yieldable rubber element may be bonded to the holder disc and to the inertia member during the molding process.

During operation of the vibration damping mechanism, the yieldable or resilient elements 43 and 44 allow limited relative movement between the inertia members 13 or 42 and the crank shaft 10. This action counteracts the normal vibration of the crank shaft and prevents regular timed impulse from being created. The yieldable or flexible element 43 forms a flexible driving connection for the fan 13 which reduces to tendency of vibration induced from the engine from causing breakage of parts of the fan. It also utilizes the weight of the fan parts as an inertia member to damp out vibrations of the crank shaft. It is preferred to provide two vibration damping units rather than to increase the weight of the fan so that this alone will serve as the inertia member for overcoming vibrations of the crank shaft. By providing an auxiliary vibration damping unit 12, the yieldable connecting element 43 does not have to be as large or to have the same rigidity that would be required if the fan 13 were made of sufficient weight to alone serve as the inertia members. The yieldable connecting element 43 may thus be made lighter and more flexible to provide the proper degree of flexibility in the drive for the fan to insure quietness of operation of the fan and reduce the likelihood of breakage of parts thereof.

Each of the vibration damping units 11 and 12 may be assembled as a complete entity with the flexible or yieldable connecting elements 43 or 44 vulcanized to the inertia members and to the holder or supporting discs 26 and 27 after which the holding disc may be connected to the sleeve 14.

A pulley wheel 45 for driving a generator or other desired accessory is rigidly fastened by bolts 46 to the opposite end wall of sleeve 14 from that to which the holding discs 26 and 27 are secured.

As many changes could be made in the above construction and many apparently widely different embodiments of this invention could be effected without departing from the scope thereof, it is intended that all matter contained in the above description or shown in the accompanying drawing shall be interpreted as illustrative and not in a limiting sense.

What is claimed is:

1. In combination, a crank shaft for an internal combustion engine, vibration damping mechanism including a fan for the cooling system of said engine and also serving as an inertia member, a second inertia member, and independent yieldable means for connecting said fan and said second inertia member for movement relative to said crank shaft.

2. In combination, a crank shaft for an internal combustion engine, a vibration damper comprising a pair of inertia members, a pair of relatively fixed members, yieldable rubber elements each located between one of said inertia members and one of said relatively fixed members respectively and independently secured thereto, and a common means for non-rotatably securing said fixed members to said crank shaft.

3. In combination, a crank shaft for an internal combustion engine, vibration damping mechanism including a fan for the cooling system of such engine and also serving as an inertia member, a second inertia member, a pair of holding discs fixed to said crank shaft, a resilient connecting element surface bonded to one of said discs and to said second inertia member to yieldably connect said member and said disc for relative movement, and a resilient connecting element surface bonded to the other of said discs and to said fan for yieldably connecting the latter for relative movement and to provide a flexible driving connection for said fan.

4. In combination, a crank shaft for an internal combustiton engine, vibration damping mechanism including a fan for the cooling system of such engine and one inertia member, a second inertia member, a pair of holding discs, a common means for securing said holding discs to said crank shaft, against relative movement to said crank shaft, and rubber elements, one yieldably connecting said fan to one of said holding discs and the other yieldably connecting said second inertia member to the other holding disc, each rubber connecting element and the inertia member and holding disc connected thereto being adapted for assembly to said crank shaft as a unit.

5. The combination with a crank shaft for an internal combustion engine, of vibration damping mechanism including a fan for the cooling system of such engine as one inertia member, a second inertia member, two holding discs each rigidly connected to said crank shaft, and two rubber connecting elements each vulcanized to one of said inertia members and to one of said holding discs, each rubber connecting element, together with the inertia member and holding disc bonded thereto being detachable from the crank shaft as a unit.

6. In an internal combustion engine having a crank shaft, a vibration damper including a member non-rotatably securable to said crank shaft and having spaced supports adapted to be secured thereon, a common means for securing said supports to said member, an inertia member located in related proximity to one of said supports, a second inertia member located in related proximity to the other support, at least one of said inertia members having means thereon for delivering a current of air to the cooling system of said engine, and yieldable means independently connecting each of said inertia members to its related support respectively.

7. In an internal combustion engine having a crank shaft, a vibration damper including a member non-rotatably securable to said crank shaft and having spaced supports thereon, an inertia member located in related proximity to one of said supports, a second inertia member located in related proximity to the other support, at least one of said inertia members having means thereon for delivering a current of air to the cooling system of said engine, and a pair of yieldable rubber elements, each interposed between adjacent surfaces of one of said inertia members and its related support respectively and integrally bonded to said surfaces for independently yieldably opposing movement of said inertia members relative to said crank shaft.

8. In an internal combustion engine having a crank shaft, a member non-rotatably securable to said crank shaft and having spaced supports thereon, inertia members each located in related proximity to one of said supports respectively and adapted for arcuate movement relative to the axis of said crank shaft, one of said inertia members having fan blades thereon so constructed and arranged as to maintain a substantially symmetrical distribution of the combined masses of said blades and the inertia member on which they are mounted with respect to the axis of said crank shaft, and yieldable means independently connecting each of said inertia members to its related support.

9. In an internal combustion engine having a crank shaft, a member non-rotatably securable to said crank shaft and having spaced supports, a fan adjacent one of said supports for delivering a current of air to the cooling system of said engine, said fan being adapted for arcuate movement relative to said crank shaft about the axis thereof for damping crank shaft vibration, and having its mass substantially symmertically distributed with respect to said axis, an inertia member located in related proximity to the other support for cooperating with said fan in damping crank shaft vibrations, and a pair of yieldable rubber elements, one between adjacent surfaces of said fan and its related support and the other between adjacent surfaces of said inertia member and its related support and independently fixed to said adjacent surfaces respectively.

JAMES C. ZEDER.